United States Patent [19]

Endo et al.

[11] Patent Number: 4,657,161

[45] Date of Patent: Apr. 14, 1987

[54] A DISPENSING CONTAINER FOR CREAM-LIKE FLUIDS

[75] Inventors: Syuzo Endo; Haruo Tsuchida, both of Tokyo, Japan

[73] Assignee: Yoshino Kogyosho Co., Ltd., Tokyo, Japan

[21] Appl. No.: 593,857

[22] Filed: Mar. 27, 1984

[30] Foreign Application Priority Data

Mar. 30, 1983 [JP] Japan .............................. 58-46461[U]

[51] Int. Cl.[4] .............................................. G01F 11/00

[52] U.S. Cl. .................................... 222/256; 222/340; 222/383; 222/386; 222/387

[58] Field of Search ............... 222/386, 387, 391, 401, 222/207, 209, 383, 478, 481, 340, 341, 256, 257, 259, 260, 380; 604/124, 125; 53/320

[56] References Cited

U.S. PATENT DOCUMENTS

| | | | |
|---|---|---|---|
| 1,643,531 | 9/1927 | Wolf | 604/125 |
| 2,893,391 | 7/1959 | Vlasic | 604/125 |
| 3,075,675 | 1/1963 | Wormser et al. | 222/386.5 X |
| 4,154,371 | 5/1979 | Kolaczinski et al. | 222/386 |
| 4,206,768 | 6/1980 | Bailey | 604/125 X |
| 4,301,948 | 11/1981 | Czech et al. | 222/341 |
| 4,485,943 | 12/1984 | Czech | 222/380 |
| 4,511,068 | 4/1985 | Bossina | 222/387 |
| 4,515,298 | 5/1985 | Czech | 222/380 |

*Primary Examiner*—H. Grant Skaggs
*Assistant Examiner*—Kevin P. Shaver
*Attorney, Agent, or Firm*—Parkhurst & Oliff

[57] ABSTRACT

A dispensing container for cream-like fluids includes a cylindrical body having upper and lower closures. The lower closure is a piston which moves toward the upper closure as the fluid is dispensed from the container. Normally, the container is filled with fluid and then closed with the lower closure. The lower closure or piston is provided with a hole which permits air between the fluid and piston to escape when the lower piston is mounted in the container. The hole is sealed with a disc located at the lower inside portion of the container. The container can advantageously and rapidly reduce the quantity of air remaining in the container thereby reducing deterioration of the fluid due to contact with air.

4 Claims, 1 Drawing Figure

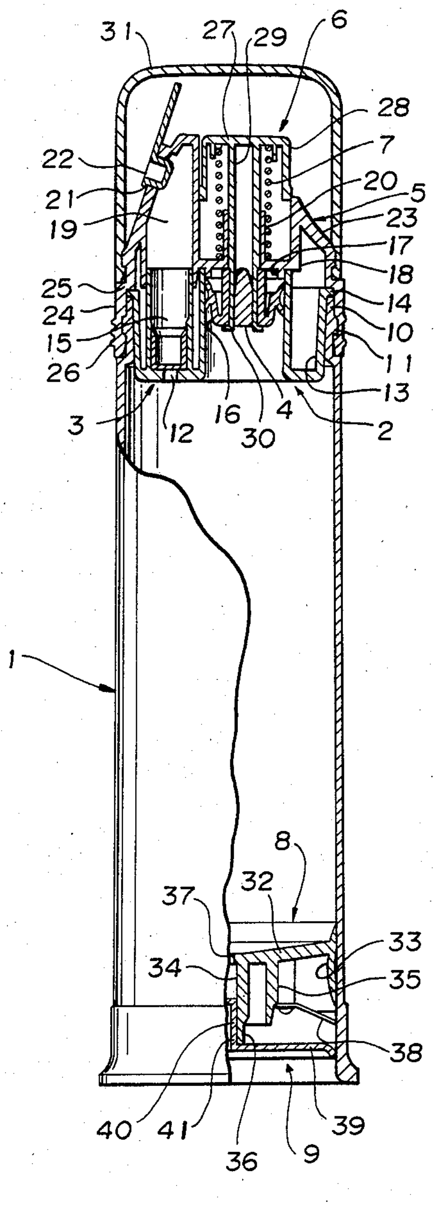
31
27
29
6
28
7
20
5
23
17
18
14
10
11
13
2
22
21
19
25
24
15
26
3
12
16
30
4
1
8
32
37
33
34
35
38
40
41
36
9
39

A DISPENSING CONTAINER FOR CREAM-LIKE FLUIDS

BACKGROUND OF THE INVENTION

This invention relates to a dispensing container for cream-like fluids.

A container of this type employs a bottom plate which automatically moves upwardly or toward the top plate by means of a negative pressure in the container when the cream-like fluid is discharged. Since the bottom plate is inserted into the container after it is filled with the fluid, the container has the drawback in that air remains in the container and deteriorates the quality of the fluid.

SUMMARY OF THE INVENTION

Accordingly, an object of the present invention is to provide a dispensing container for cream-like fluids which rapidly reduces the quantity of air remaining in the container in case a bottom plate is inserted into the container after it is filled with the fluid.

BRIEF DESCRIPTION OF THE DRAWINGS

The above and other related objects and features of the invention will be apparent from a reading of the following detailed description of the disclosure in conjunction with the accompanying drawing.

The FIGURE illustrates a partially cross-sectional view of an embodiment of the dispensing container for cream-like fluids constructed according to the present invention.

DETAILED DESCRIPTION OF THE PREFERRED EMBODIMENT

As shown in the Figure, a cylindrically shaped container 1 includes an outer cover 31, and an inner container end structure 2 disposed at an upper end opening of the container 1. A discharge unit 3 is integral with the inner container end structure 2 and located on one side of the container. An outer container end structure 5 is engaged on an upper portion of the container 1 to abut the inner container end structure 2 from above. A push-button 6 is provided such that pressing the push-button 6 drives an upper piston 4 slidably centrally disposed in the structure 2. The pushbutton 6 is pressed against a spring 7 and slides within the guidance of the outer container end structure 5. A lower piston 8 is disposed within and at a lower end of the container and a disc 9 is associated with the lower piston 8 for clamping the lower piston 8.

The upper end portion 10 of container 1 is slightly less in diameter than the rest of the container 1, and an engaging projection 11 is formed on the outer periphery of the upper end portion 10 to engage with the outer container end structure 5.

The inner container end structure 2 is formed integrally with the discharge unit 3 having a smaller diameter. A discharge portion 12 is located at the bottom wall of the discharge unit 3 in such a manner that a peripheral wall 13 common with the outer periphery is internally engaged within the upper end portion 10 of the container 1, and an outward flange 14 of the upper end of the peripheral wall 13 is engaged with a top portion of the upper end portion 10 of the container 1. A discharge plug 15 which functions as a check valve is provided in the discharge unit 3 to block the discharge portion 12 from above. The discharge plug 15 is cup-shaped and made with a resilient material cut with a tongue-shaped valve body at the bottom wall.

The upper piston 4 is slidably inserted under pressure at the elastic peripheral wall 16 of an arcuate section of the inner container end structure 2 and extends longitudinally in the center of the inner container end structure 2.

The outer container end structure 5 is formed integrally with a guide 18 at the center thereof and includes a discharge passage 19 on one side thereof. The discharge passage 19 extends upwardly from the outlet of the discharge unit 3 adjacent to the guide 18 in such a manner that a peripheral wall 17 of the guide 18 at the lower surface thereof is inserted into an upper end portion of the inner container end structure 2. A hollow cylinder guide 20 of a smaller diameter than the guide 18 is formed at the center thereof to communicate with the inner container end structure 2 and extends longitudinally therethrough.

An end cap structure 21 is perforated at an oblique intermediate part of the outer peripheral wall of the passage 19, and is closed off with a removable plug 22 including a knob. The outward flange 14 of the inner container end structure 2 is retained by a step 25 on the peripheral wall 24 of the outer container end structure 5. The step shaped peripheral wall 24 joins a flared oblique wall 23 from the guide 18 and the outer surface of the passage 19. An engaging groove 26 formed on the inner periphery of the periphery wall 24 is engaged with the projection 11 to be engaged with the upper end portion 10 of the container 1.

The push button 6 includes a peripheral wall 28 guided by the guide 18 from the peripheral edge of a top wall 27 and is urged upwardly by the spring 7 interposed between the guide 18 and the top wall 27. A longitudinally extending cylinder 29 extends from the center of the push button 6 on the lower surface of the top wall 27 to the cylinder 20. The lower end of the cylinder 29 comprises a plurality of posts 30 which integrally enclose the piston 4 by bending the ends of the posts 30.

The lower piston 8 is constructed such that an elastic peripheral wall 33 of an arcuate-shaped section at the peripheral edge of a bottom plate 32, is pressed on the inner peripheral wall surface of the container 1 to be airtight and slidably disposed within the container 1. Inner and outer cylinder shaped members 34 and 35 depend from the lower surface of the bottom plate 32. An engaging section or engaging groove 36 is formed on the lower inner periphery of the inner cylinder shaped member 34. The bottom plate 32 includes an air bleed hole 37. A plurality of leaf springs 38 (only one is shown for clarity) are disposed at the lower end on the inner wall surface of the container 1 and extend radially from the lower end of the outer cylinder shaped member 35. The leaf springs 38 are obliquely mounted at the lower oblique part thereof so as to slide upwardly and not downwardly.

A disc 9 disposed in the container 1 at the lower end thereof includes a cylindrical plug body 40 which projects upwardly at the center of a plate like member 39. The member 39 is slidably engaged within the container 1, and a protruding strip 41 is formed on the outer periphery of the plug body 40 to be engaged with the engaging section 36 thereby fixedly inserting it to the inner cylinder portion 34 to block the hole 37 of the piston 8.

In the container described above, when the cream-like fluid is dispensed from the container 1, the cover 31 and the plug 22 are removed and the push button 6 is depressed downwardly to develop a pressure inside the container 1. When under such pressure, the fluid causes the discharge plug 15 of the discharging portion 12 to open, and the fluid is discharged from the end cap structure 21 through the discharge passage 19. Once the pressure on the pushbutton 6 is released, the push button 6 returns to its initial position by the force of spring 7, thereby creating a negative pressure in a portion of the interior of the container 1, with the result that the lower piston 8 and the disc 9 move upwardly.

In this invention, the lower piston 8 is mounted at the lower end of the container 1 after the fluid is filled in the container 1. Since the bottom piston 8 is provided with the hole 37, most of the air between the bottom piston 8 and the fluid escapes to the outside through the hole 37 during mounting of the lower piston 8. Thus, the quantity of air remaining in the container 1 is extremely small. Thereafter, the plug 9 closes the opening.

Accordingly, the container of the present invention is highly reliable in that the fluid deterioration is reduced due to decreased reaction between air and the fluid.

We claim:

1. A container for cream-like fluids, comprising:

a cylindrical body having a dispensing end and a sealed end, the dispensing end including an inner container end structure and an outer container end structure located above said inner container end structure;

the inner container end structure including a discharge unit with a discharge valve in a discharge port that communicates with said body;

the outer container end structure including a guide, a guide cylinder disposed within the guide and communicating with the inner container end structure, and an exhaust port communicating with a discharge chamber connected to the discharge port of the inner container end structure, the outer container end structure engaged with the body with said inner container end structure engaged therebetween;

the sealed end including a lower piston perforated with an air bleed hole, the air bleed hole being air-tightly sealed by a plug; and a pushbutton associated with the inner and outer container end structures for dispensing the cream-like fluid from the body, the pushbutton having a top wall with a depending peripheral wall slidably received within the guide of the outer container end structure, the pushbutton further including a depending cylinder slidably disposed within the guide cylinder, the end of the depending cylinder opposite from said top wall being associated with an upper piston slidably received within a portion of the inner container end structure, the upper piston being integrally secured to the depending cylinder by posts which extend from the depending cylinder to the upper piston, a spring being disposed between said top wall of said pushbutton and a bottom wall of said guide of the outer container end structure to urge said pushbutton and said upper piston away from said sealed end, said cylindrical body having an inner peripheral wall surface, said lower piston having an elastic peripheral wall of an arcuate-shaped section at a peripheral edge of said lower piston such that it is airtightly pressed against the inner wall surface of said body and slidably engaged with said inner wall, inner and outer cylinder shaped members depending from a lower surface of the lower piston, said inner cylinder shaped member having a lower inner periphery with an engaging section formed thereon, said air bleed hole of the lower piston being disposed within the inner cylinder shaped member, said plug of said lower piston comprising a cylindrical plug body projecting upwardly from the center of a substantially flat plate, said flat plate being slidably engaged with the inner wall surface of the body, and the plug body being received within the engaging section of the inner cylinder shaped member, thereby fixedly securing the plug to the inner cylinder shaped member to block the air bleed hole.

2. The container according to claim 1, further comprising a plurality of leaf springs having ends pressed against the inner wall surface of said body such that said leaf springs extend radially from the lower end of the outer cylinder to the inner wall, the ends of said leaf springs being positioned against said inner wall to flex said leaf spring such that said ends slide only upwardly in engagement with said inner wall.

3. The container according to claim 1, wherein said inner container end structure is formed in a hollow cylindrical shape integrally with the discharge unit, the discharge unit being opened with the discharge port at a bottom wall thereof and having a discharge opening communicating with the inside of said container in such a manner that a peripheral wall common to an inner periphery of said body, is internally engaged within the sealed end of said body, and an outward flange of an upper end of the peripheral wall is engaged with and mounted on a top portion of the body.

4. The container according to claim 1, wherein the upper piston in said inner container end structure includes an elastic peripheral wall having an arcurate section which is inserted into said portion of the inner container end structure.

* * * * *